UNITED STATES PATENT OFFICE.

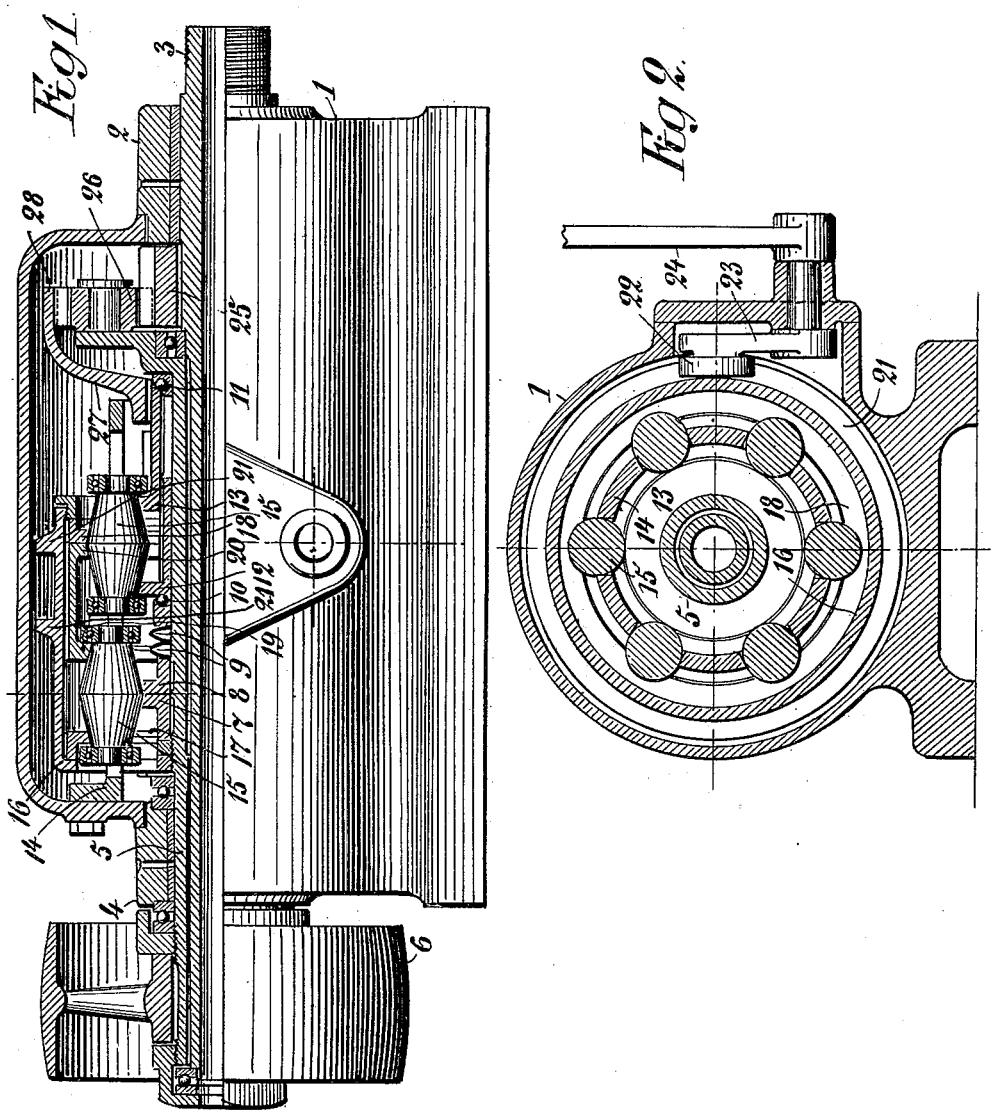

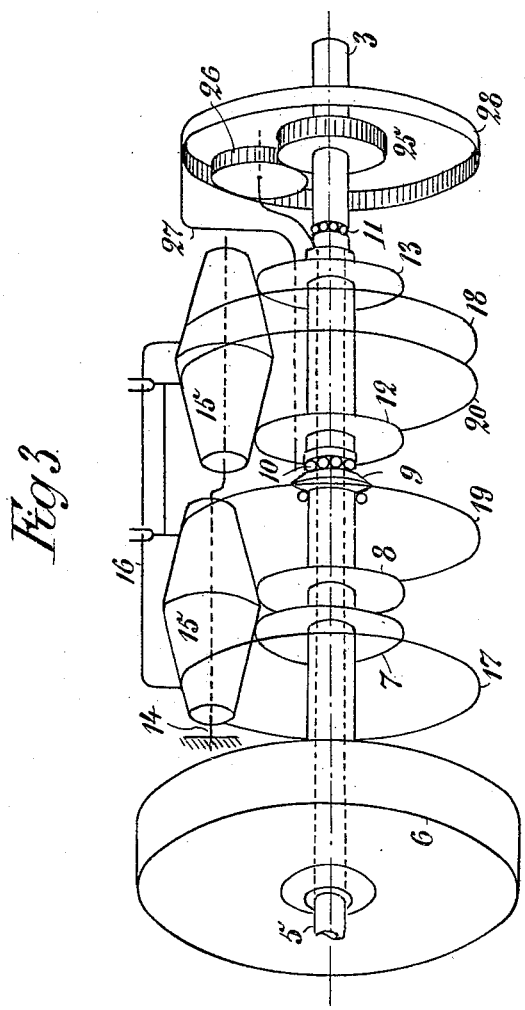

JENS CHRISTIAN MARTINS, OF COPENHAGEN, DENMARK, ASSIGNOR TO TRANSMISSION AKTS., OF COPENHAGEN, DENMARK, A FIRM.

FRICTIONAL VARIABLE-SPEED GEARING.

1,136,690.  Specification of Letters Patent.  Patented Apr. 20, 1915.

Application filed February 27, 1914. Serial No. 821,478.

*To all whom it may concern:*

Be it known that I, JENS CHRISTIAN MARTINS, a subject of the King of Denmark, and residing at Copenhagen, Denmark, have invented certain new and useful Improvements in Frictional Variable-Speed Gearings, of which the following is a full, clear, and exact description.

The present invention relates to a frictional gearing with variable speed and consists in a combination of a friction gearing of the kind in which the variable gearing is effected by the power being transmitted through two sets of double conical bodies, which on one side roll on the outer circumferences of flanges or disks and on the other side on the inner surfaces of rings, so that a variation of speed can be effected through mutual displacement of the said rings and flanges, so that the said double conical bodies will roll on different diameters, with an ordinary planetary system consisting of spur wheels. Frictional gearings of the kind in question are well known and among others, described in the U. S. A. Patent No. 1,058,981. The combination of such a known friction gearing with a likewise well known planetary system consisting of spur wheels entail different advantages as for instance that the joint combination in a simple manner makes possible idle running and reversing, and it can also be compacted in a small space and is thus adapted for being built into the head-stock of a turning lathe or other tool machine, so that the entire system is grouped around the shaft or spindle of the said machine. Through such a combination can likewise be obtained an exceedingly great variation of gearing.

By way of example in the drawing Figure 1 shows a head-stock provided with the gearing according to the invention partially in longitudinal section, Fig. 2 is a transverse section and Fig. 3 a diagrammatic view indicating how the various parts are mutually connected.

In Figs. 1 and 2 1 is a frame or a casing in front carrying a bearing 2 for the foremost part of the spindle 3. The casing 1 carries rearward a bearing 4 for a bushing 5 forming bearing for the rearmost end of the spindle 3 and carrying outside the bearing 4 the pulley 6 to which the power is transmitted. The bushing 5 carries inside the casing 1 the two flanges or disks 7 and 8, the former of which is rigidly secured thereon, while the latter is slidably keyed thereon. Further the bushing carries a set of Belleville springs 9, serving for producing the necessary friction, and ball bearings 10 and 11 by means of which are supported the flanges 12 and 13 connected by groove and tongue. The foremost end of the bushing 5 forms the planet wheel carrier in the planetary system consisting of spur wheels. On the inner side of the casing 1 is fixed a cylinder 14 with rectangular openings serving for accommodating and guiding the ball bearings which carry the double conical bodies 15 (*vide* Fig. 2), and these latter are surrounded by a cylinder casing 16 carrying two rings 17 and 18 fixed in the same, while the mutually firmly connected rings 19 and 20 are arranged in the casing 16 by groove and tongue connection. The casing 16 carries outside two flanges 21 between which is found a roll 22, Fig. 2, on an arm 23 by means of which the casing 16 through acting of a hand lever 24 can be somewhat axially displaced. The planetary system consisting of spur wheels is composed of the sun wheel 25 keyed to the spindle 3, the planet wheels 26 connected with the bushing 5 and a cup 27 which is forced to follow the revolutions of the flanges 12 and 13 and carries an inner tooth rim 28.

In the diagrammatic view shown in Fig. 3 only one single double conical body is shown in each set, and the various flanges and rings are only indicated by single lines indicating their running surfaces for the bodies. The shaft 3 is here shown in prolongation of the bushing 5, while only this latter is shown going through.

It is presumed that through displacement of the cylinder 16 by means of the hand lever 24 the cylinder 16 has been placed in such a position that the outer rings are at the same plane as the corresponding inner flanges, so that the double conical bodies 15 roll with the same diameter on all contacting surfaces, and the pulley 6 is rotated with a certain number of revolutions, it will be seen through inspection of Fig. 3 that the flanges 12 and 13 will be turned in the same direction and at the same speed as the flanges 7 and 8 or the pulley 6. The outer tooth rim 28 connected with the flanges 12 and 13 will then be turned in the same manner. The same is the case with the carrier for the planet wheels 26 fixed on the bushing 5, on which the pulley 6 is keyed. The tooth rim 28 and the planet wheels 25 will thus no longer move in relation to each other and the planet wheels will simply carry along the sun wheel 25 and thus also the shaft 3, acting as a carrier. If the cylinder 16 is displaced from this middle position to the position shown in the drawing, the driving flanges 7 and 8 will impart to the bodies 15 a smaller speed of rotation, as they run on a greater diameter, and as on the rings 17 and 19 they run with a smaller diameter, these rings will rotate at a much reduced speed in relation to previously. This speed which is transmitted from the rings 18 and 20 to the flanges 12 and 13 will be further reduced so that the tooth rim 28 will be rotated at much reduced speed. As the carrier for the planet wheels 26 always rotates with the speed of the pulley 6, this will incur that the shaft 3 is rotated in the same direction as the planet wheel carrier as well as the tooth rim 28, but at a speed much smaller than that of the pulley 6. If on the contrary the cylinder 16 is placed in such a position that the flanges 7 and 8 run on the smallest diameters of the double conical bodies 15, while the flanges 12 and 13 run on the greatest diameters of the corresponding conical bodies, the rings 17 and 19 at the same time roll on the largest diameters and the rings 18 and 20 on the smallest diameters of the bodies in question. This will incur that the speed transmitted to the tooth rim 28 becomes rather great, while that transmitted to the carrier of the planet wheels 26 always remains constant and equal to the speed of the pulley 6, so that the shaft 3 will change direction of rotation. It is obvious that between the middle position of the cylinder 16 first described and that latest described will be found an intermediate position in which the tooth wheel 25 and therewith the shaft 3 will come to a stand still.

The described manner of combination is only to be considered as given by way of example, and the various elements of the planetary system can be connected in other ways with the other parts of the apparatus, so that the reversing of the shaft 3 can yet be obtained.

Having thus fully described my invention, I claim as new and desire to secure by Letters Patent:

1. In combination, a gearing comprising a driving shaft, a driven shaft, two sets of outer rings two sets of inner flanges and two sets of double conical friction bodies adapted to coact each with one set of said flanges and rings, one of said sets of flanges being connected to said driving shaft, means for relatively displacing said rings and flanges, and a planetary system comprising a sun wheel, planetary gears and a tooth rim, one element of the said system being connected with said driving shaft, another with one set of the elements coacting with the double conical bodies and the third element with said driven shaft.

2. In combination, a gearing comprising a driving shaft, two inner flanges connected therewith, two outer rings, double conical bodies adapted to roll on the circumference of said flanges and inside said outer rings, two other outer rings non-rotatably connected with said outer rings, two other inner flanges, a set of double conical bodes adapted to roll inside the second outer rings and on the circumference of said other inner flanges, means for relatively displacing said rings and flanges, an outer tooth rim connected with the latter inner flanges and planetary wheels adapted to coact with said tooth rim and connected with the driving shaft, a sun wheel meshing with said planetary wheels and a driven shaft connected with the sun wheel.

In witness whereof, I have subscribed my signature, in the presence of two witnesses.

JENS CHRISTIAN MARTINS.

Witnesses:
CECIL V. SCHON,
VIGGO BLOM.

Copies of this patent may be obtained for five cents each, by addressing the "Commissioner of Patents Washington, D. C."